(12) United States Patent
Salha

(10) Patent No.: US 10,023,215 B2
(45) Date of Patent: Jul. 17, 2018

(54) PEDAL DRIVEN CART SYSTEM

(71) Applicant: Ramzi Salha, Tulsa, OK (US)

(72) Inventor: Ramzi Salha, Tulsa, OK (US)

( * ) Notice: Subject to any disclaimer, the term of this patent is extended or adjusted under 35 U.S.C. 154(b) by 0 days.

(21) Appl. No.: 15/341,135

(22) Filed: Nov. 2, 2016

(65) Prior Publication Data

US 2018/0118244 A1  May 3, 2018

(51) Int. Cl.
| | | |
|---|---|---|
| *B62B 5/00* | (2006.01) | |
| *B62K 7/04* | (2006.01) | |
| *B62K 27/14* | (2006.01) | |
| *B62B 3/00* | (2006.01) | |
| *B62B 3/02* | (2006.01) | |

(52) U.S. Cl.
CPC ............ *B62B 5/0026* (2013.01); *B62B 3/008* (2013.01); *B62B 3/02* (2013.01); *B62K 7/04* (2013.01); *B62K 27/14* (2013.01)

(58) Field of Classification Search
CPC .............................. B62B 5/0026; B62B 5/0083
See application file for complete search history.

(56) References Cited

U.S. PATENT DOCUMENTS

| | | | |
|---|---|---|---|
| 2,482,585 A | 9/1949 | Hauptman | |
| 3,044,801 A * | 7/1962 | Vicany | B62B 5/0026 280/202 |
| 3,834,726 A | 9/1974 | Hobza | |
| 5,011,169 A | 4/1991 | Henderson et al. | |
| 6,651,993 B1 | 11/2003 | Emerzian et al. | |
| D526,250 S | 8/2006 | Tremble et al. | |
| D530,578 S | 10/2006 | Splain et al. | |
| 7,261,308 B2 * | 8/2007 | Gwisdalla | B62B 9/00 280/212 |
| 7,566,069 B1 * | 7/2009 | Ortega | B62B 3/027 280/32.6 |
| 7,591,509 B2 | 9/2009 | Almy | |
| 9,033,355 B2 | 5/2015 | Lin | |
| 9,321,472 B2 * | 4/2016 | Yadan | B62K 5/05 |
| 2003/0229966 A1 * | 12/2003 | Boice | B62B 9/20 16/110.1 |
| 2013/0305486 A1 * | 11/2013 | Sonnendorfer | B62B 3/1416 16/111.1 |
| 2015/0197264 A1 * | 7/2015 | Fields | A63C 17/1409 180/180 |

FOREIGN PATENT DOCUMENTS

| | | | |
|---|---|---|---|
| CN | 104192241 A | * | 12/2014 |
| EP | 1132284 | | 6/2001 |

* cited by examiner

*Primary Examiner* — Kevin Hurley (57) ABSTRACT

A pedal driven cart system combining pedals and a cart includes a shopping cart. A pedal unit is provided. The pedal unit is removably coupled to the shopping cart. Thus, the pedal unit is pedaled thereby facilitating the shopping cart to be rolled along a support surface.

18 Claims, 6 Drawing Sheets

PEDAL DRIVEN CART SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98.

The disclosure and prior art relates to cart devices and more particularly pertains to a new cart device combining pedals and a cart.

BRIEF SUMMARY OF THE INVENTION

An embodiment of the disclosure meets the needs presented above by generally comprising a shopping cart. A pedal unit is provided. The pedal unit is removably coupled to the shopping cart. Thus, the pedal unit is pedaled thereby facilitating the shopping cart to be rolled along a support surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new cart device embodying the principles and concepts of an embodiment of the disclosure and generally designated by the reference numeral 10 will be described.

As best illustrated in FIGS. 1 through 6, the pedal driven cart system 10 generally comprises a shopping cart 12 that has a basket 14 and a frame 16. The basket 14 has a back side 18 and the frame 16 has a rear member 20. The rear member 20 is horizontally oriented beneath the back side 18 of the basket 14. The shopping cart 12 may be a shopping cart of any conventional design.

A pedal unit 22 is provided. The pedal unit 22 is removably coupled to the shopping cart 12. The pedal unit 22 is pedaled thereby facilitating the shopping cart 12 to be rolled along a support surface 24. The support surface 24 may be a floor or the like.

The pedal unit 22 comprises a shell 26 that has top wall 28 and a peripheral wall 30 extending downwardly therefrom. The peripheral wall 30 has a distal edge 32 with respect to the top wall 28 and the distal edge 32 defines an opening 34 into the shell 26. The peripheral wall 30 has a first lateral side 36 and a second lateral side 38. Moreover, the top wall 28 is concavely arcuate between a front side 40 and a back side 42 of the shell 26. Thus, the shell 26 has a semi-circular shape.

A wheel 44 is provided and the wheel 44 is rotatably positioned in the shell 26. The wheel 44 extends downwardly from the distal edge 32 of the shell 26. Thus, the wheel 44 rolls along the support surface 24. The wheel 44 may be a spoked bicycle wheel or the like.

An axle 46 is provided. The axle 46 has a first end 48 and a second end 50. The axle 46 rotatably extends through the first lateral side 36 and the second lateral side 38 of the shell 26. Moreover, the axle 46 extends through the wheel 44 and the wheel 44 is rotatably coupled to the axle 46.

A pair of pedals 52 is provided and each of the pedals 52 is rotatably coupled to the shell 26. Thus, each of the pedals 52 may be stood upon thereby facilitating each of the pedals 52 to be pedaled. Each of the pedals 52 is coupled to the axle 46. Thus, the wheel 44 rotates when the pedals 52 are pedaled. The pair of pedals 52 includes a first pedal 54 and a second pedal 56.

Each of the pedals 52 comprises a first arm 58 that has a primary end 60 and a secondary end 62. The primary end 60 is coupled to the axle 46 and the first arm 58 is oriented perpendicular to the axle 46. The first arm 58 corresponding to the first pedal 54 is positioned on the first end 48 of the axle 46. The first arm 58 corresponding to the second pedal 56 is positioned on the second end 50 of the axle 46. Moreover, the secondary end 62 orbits about an axis extending through the first end 48 and the second end 50 of the axle 46 when the pedals 52 are pedaled. The first arm 58 corresponding to the first pedal 54 is offset one hundred eighty degrees of rotation with respect to the first arm 58 corresponding to the second pedal 56.

A second arm 64 is provided that has a leading end 66 and a following end 68. The leading end 66 is coupled to the peripheral wall 30 of the shell 26 and the second arm 64 is spaced from the peripheral wall 30. The second arm 64 corresponding to the first pedal 54 is positioned on the first lateral side 36 of the shell 26. The second arm 64 corresponding to the second pedal 56 is positioned on the second lateral side 38 of the shell 26. Moreover, the following end 68 orbits around an axis extending through the first lateral side 36 and the second lateral side 38 when the pedals 52 are pedaled. The second arm 64 corresponding to the first pedal 54 is offset one hundred eighty degrees of rotation with respect to the second arm 64 corresponding to the second pedal 56. Additionally, the leading end 66 of the second arm 64 is aligned with the primary end 60 of the first arm 58.

A panel 70 is provided that has a top surface 72 and a peripheral edge 74. The peripheral edge 74 has a first side 76. Each of the secondary end 62 and the following end 68 are rotatably coupled to the first side 76. The top surface 72 is horizontally oriented. Thus, the top surface 72 is stood upon thereby facilitating the pedals 52 to be pedaled. The top surface 72 is textured thereby enhancing gripping the top surface 72.

A third arm 78 is coupled to the top wall 28 of the shell 26. The third arm 78 is oriented to extend forwardly from the shell 26 at an upward angle. Moreover, the third arm 78 has a distal end 80 with respect to the shell 26 and a top side 82. A plurality of rings 84 is provided. Each of the rings 84 is coupled to the top side 82 of the third arm 78. Thus, each of the rings 84 may be gripped thereby facilitating the pedal unit 22 to be manipulated.

A clamp 86 is provided. The clamp 86 is coupled to the distal end 80 of the third arm 78 and the clamp 86 may be manipulated. The clamp 86 releasably engages the rear member 20 of the shopping cart 12. Thus, the pedal unit 22 is removably coupled to the shopping cart 12.

The clamp 86 comprises a bottom jaw 88 that is coupled to the top side 82 of the third arm 78. The bottom jaw 88 is concavely arcuate. A top jaw 90 is hingedly coupled to the bottom jaw 88 and the top jaw 90 is selectively urged into a closed position. The top jaw 90 is concavely arcuate such that the clamp 86 forms a substantially closed loop when the top jaw 90 is in the closed position. Each of the top jaw 90 and the bottom jaw 88 engage the rear member 20 of the shopping cart 12 when the top jaw 90 is in the closed position. A lever 92 is coupled to the top jaw 90 and the lever 92 may be manipulated. The lever 92 urges the top jaw 90 into the closed position.

A handle 94 is provided and the handle 94 is coupled to the shopping cart 12. The handle 94 may be gripped thereby facilitating stability when the pedals 52 are pedaled. The handle 94 has a first end 96 and a second end 98. The handle 94 is horizontally oriented on the back side 18 of the shopping cart 12.

The handle 94 has a pair of bends 100 thereon. The bends 100 are spaced apart from each other to define a pair of end portions 102. Each of the end portions 102 extends away from the back side 18 of the shopping cart 12. A pair of grips 104 is provided and each of the grips 104 is coupled to the handle 94. Each of the grips 104 is aligned with an associated one of the first end 48 and the second end 50 of the handle 94.

Figure 1:
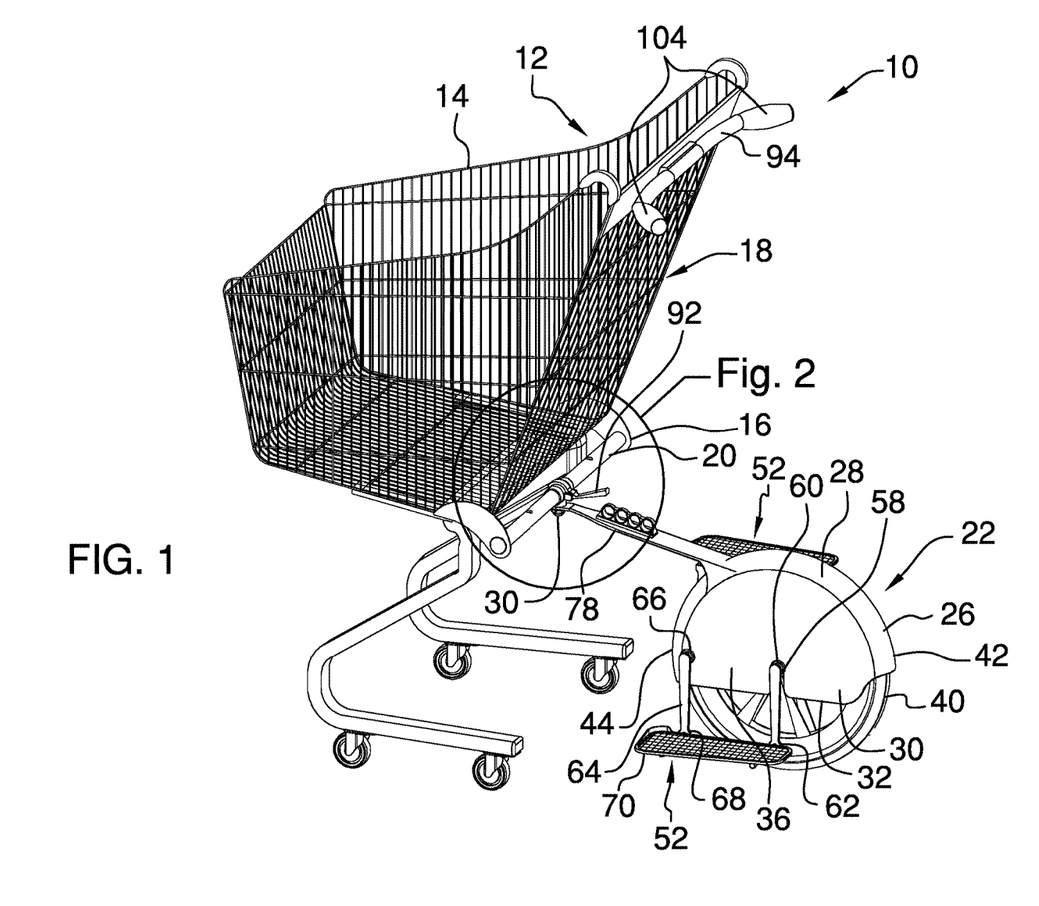
FIG. 1 is a perspective view of a pedal driven cart system according to an embodiment of the disclosure.
Figure 2:
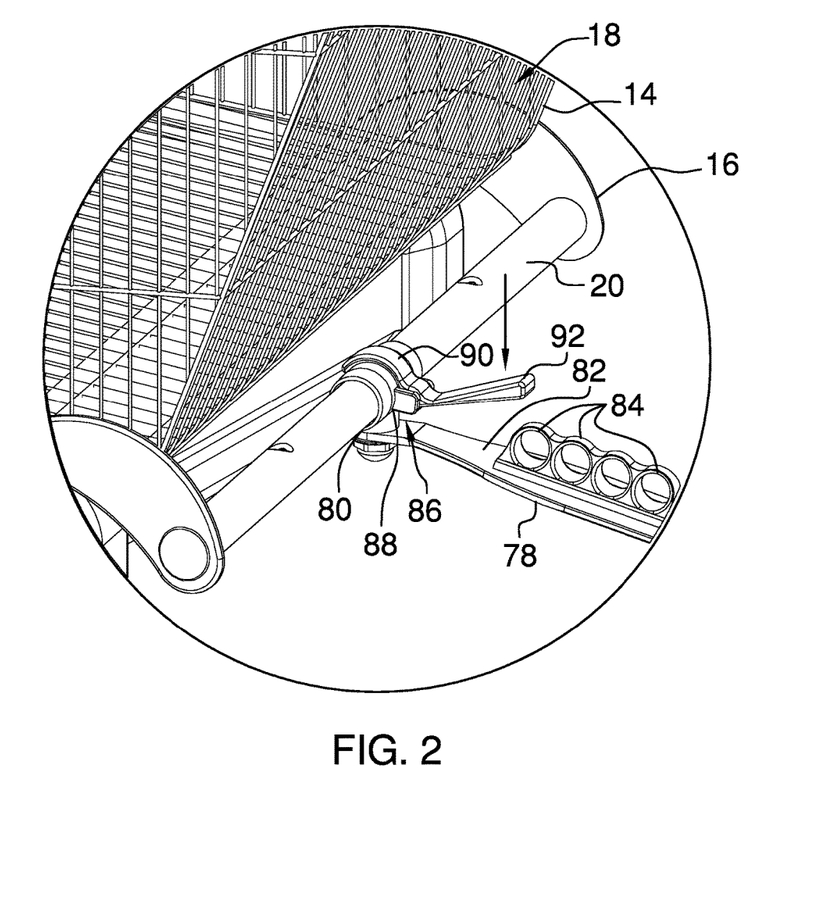
FIG. 2 is a detail view taken from circle 2 of FIG. 1 of an embodiment of the disclosure.
Figure 3:
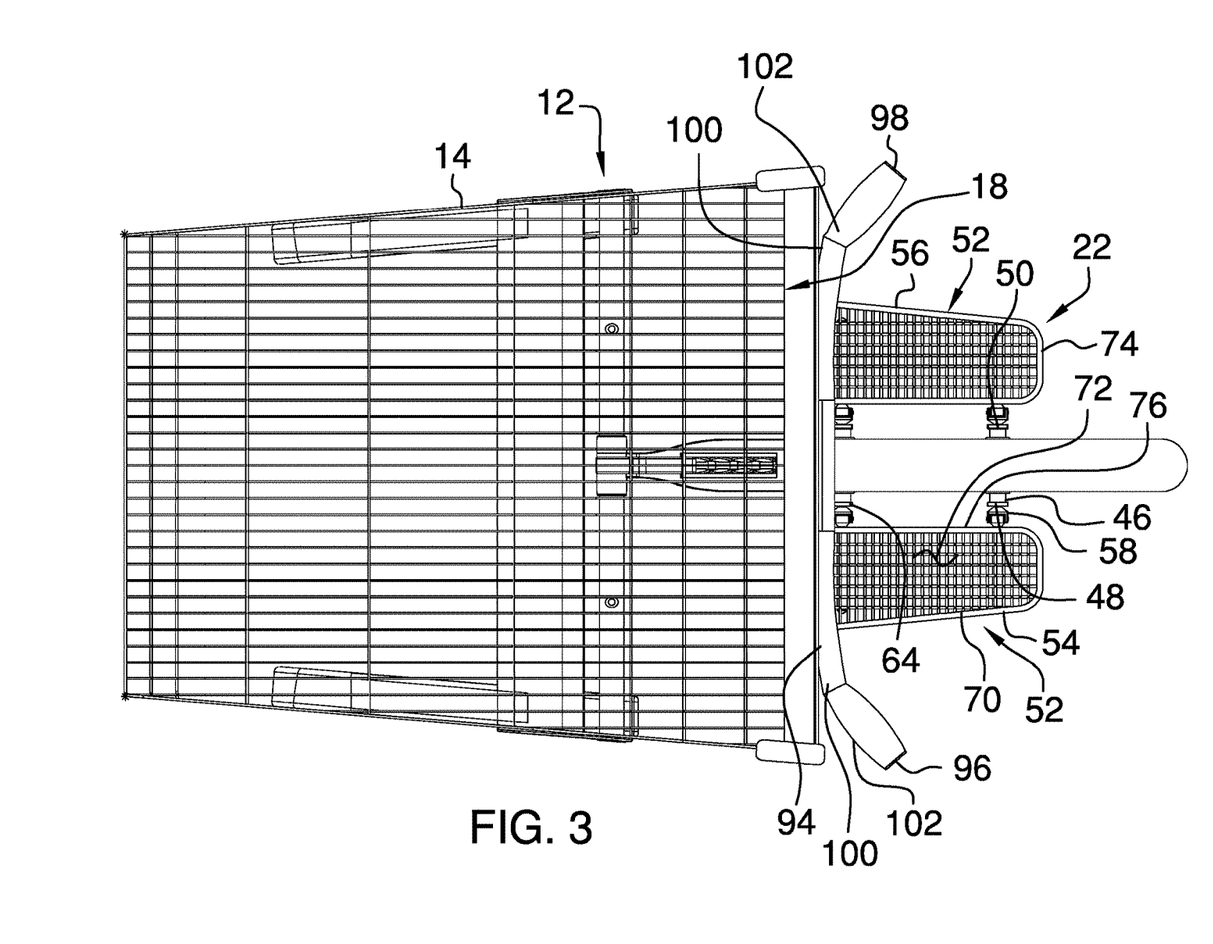
FIG. 3 is a top view of an embodiment of the disclosure.
Figure 4:
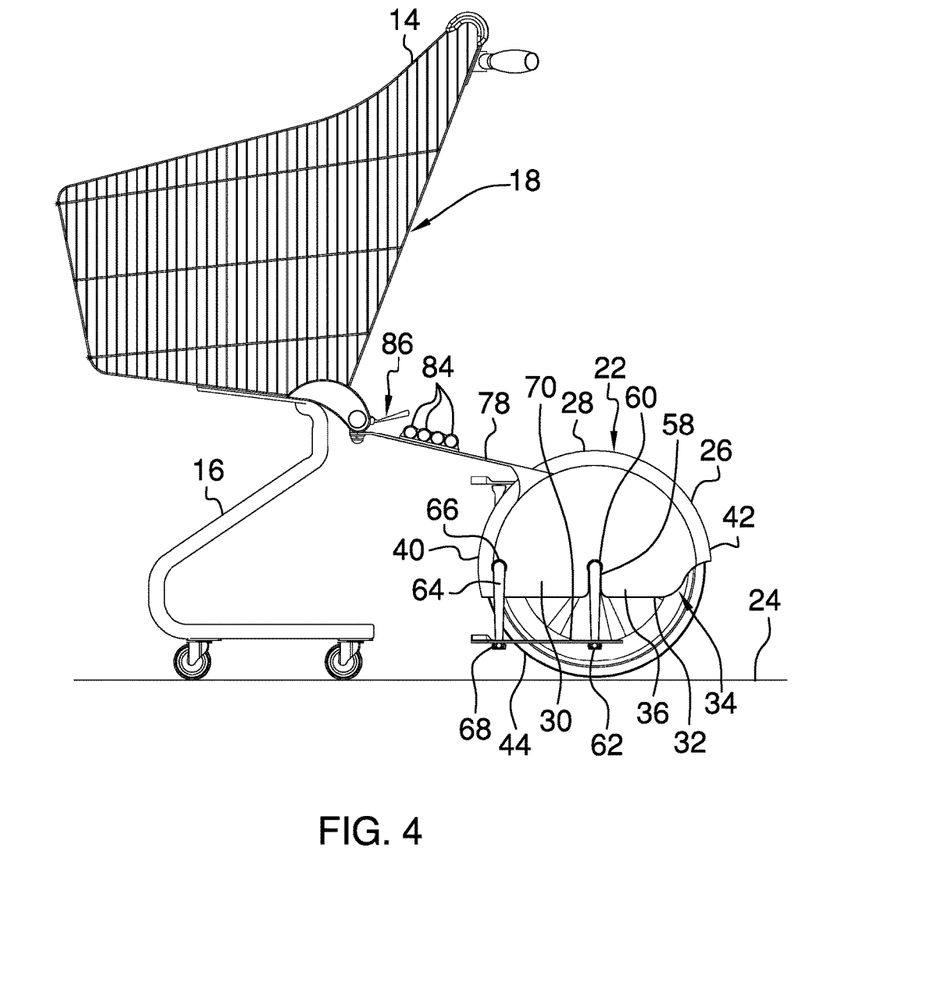
FIG. 4 is a left side view of an embodiment of the disclosure.
Figure 5:
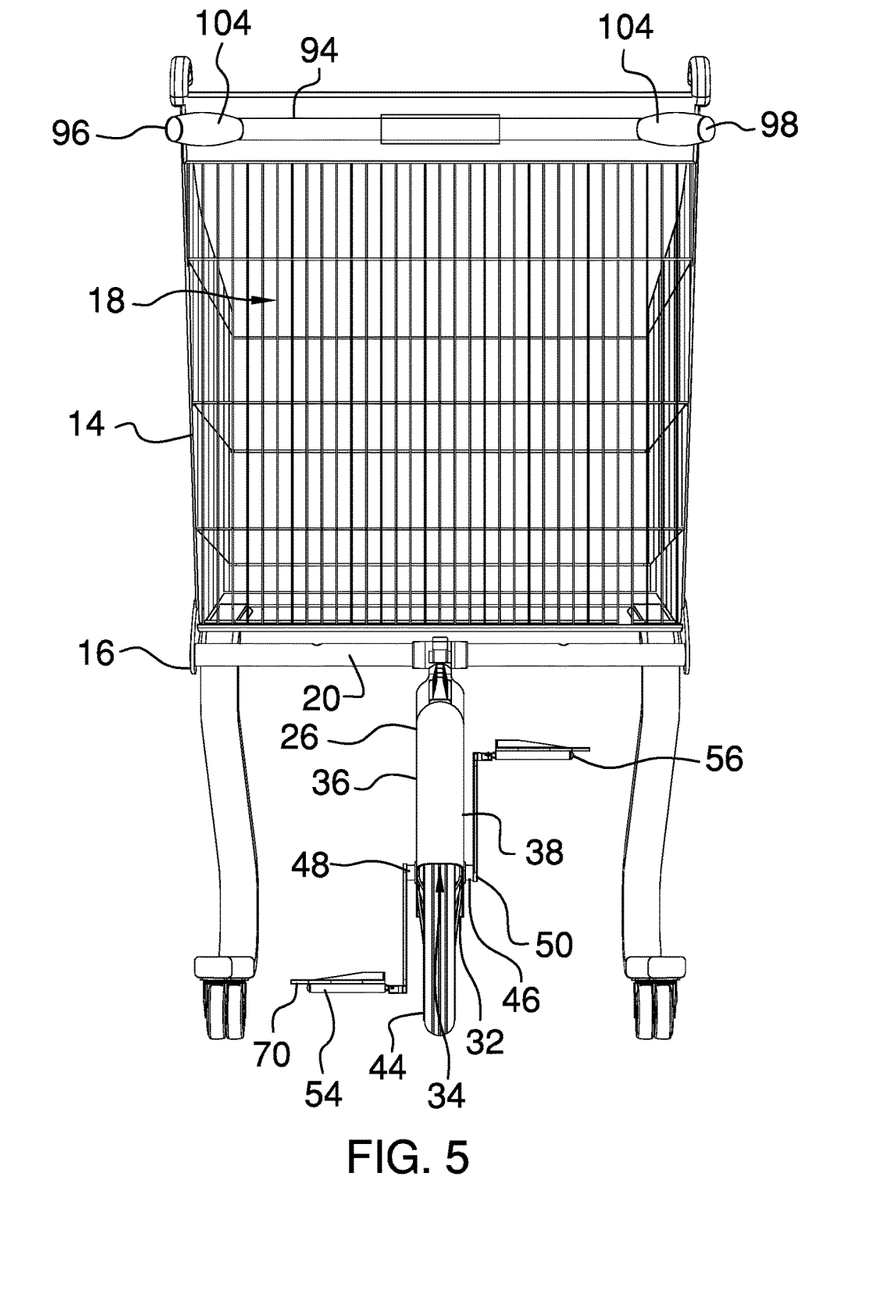
FIG. 5 is a back view of an embodiment of the disclosure.
Figure 6:
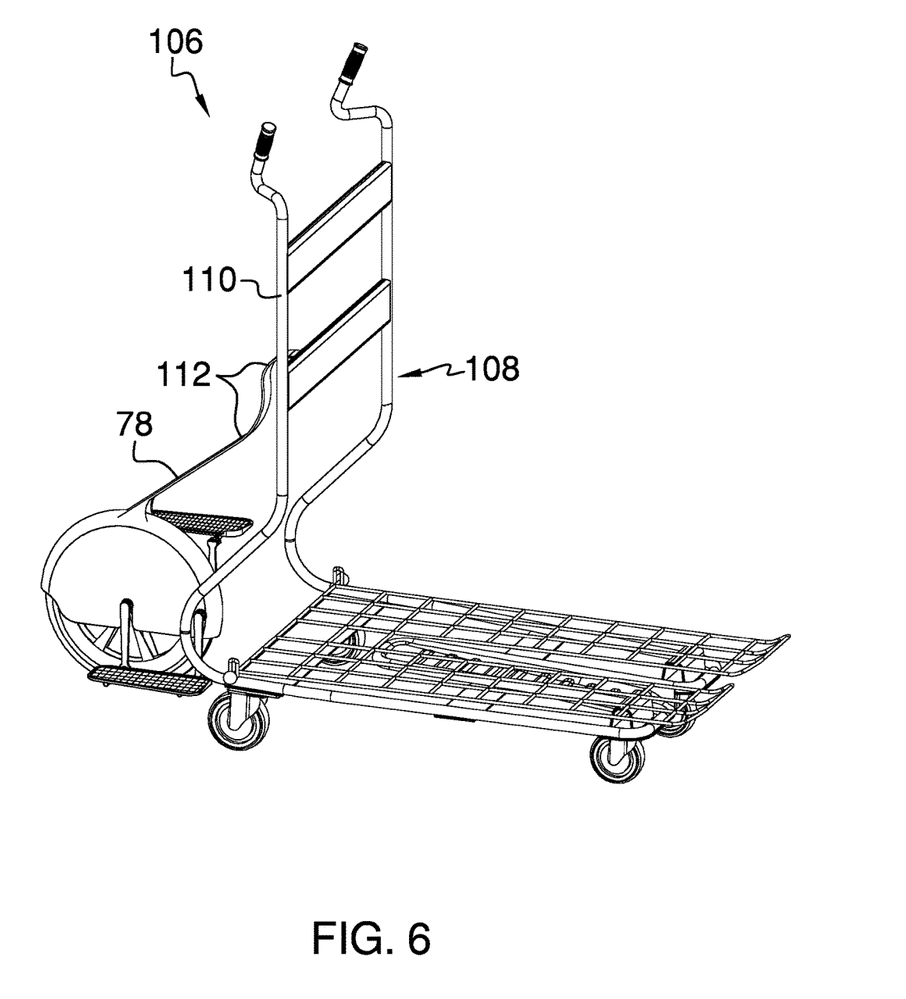
FIG. 6 is a perspective view of an alternative embodiment of the disclosure.

In an alternative embodiment 106 as shown in FIG. 6, a flat bed cart 108 may be provided. The flat bed cart 108 may include a handle 110. The third arm 78 may have a pair of curves 112 thereon. The curves 112 may be spaced apart from each other and the curves 112 may be congruent with each other. Thus, the third arm 78 may have an S-shape thereby inhibiting the third arm 78 from contacting a crotch when the pedals 52 are pedaled. The distal end 80 of the third arm 78 may be attached to the handle 110 on the flat bed cart 108.

In use, each of the grips 104 on the handle 94 is gripped and the panel 70 corresponding to each of the pedals 52 is stood upon. Each of the pedals 52 is alternatively urged downwardly to rotate the wheel 44. Thus, the wheel 44 urges the shopping cart 12 along the support surface 24. The pedal unit 22 combines exercise with shopping thereby enhancing health. The shopping cart 12 is manipulated in the convention of shopping carts.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pedal driven cart system comprising:
a shopping cart; and
a pedal unit being removably coupled to said shopping cart wherein said pedal unit is configured to be pedaled thereby facilitating said shopping cart to be rolled along a support surface, wherein said pedal unit comprises a shell having top wall and a peripheral wall extending downwardly therefrom, said peripheral wall having a distal edge with respect to said top wall, said distal edge defining an opening into said shell, said peripheral wall having a first lateral side and a second lateral side, said top wall being concavely arcuate between a front side and a back side of said shell such that said shell has a semi-circular shape.

2. The system according to claim 1, wherein said shopping cart has a basket and a frame, basket having a back side, said frame having a rear member, said rear member being horizontally oriented beneath said back side of said basket.

3. The system according to claim 1, further comprising a wheel being rotatably positioned in said shell, said wheel extending downwardly from said distal edge of said shell wherein said wheel is configured to roll along the support surface.

4. The system according to claim 3, further comprising an axle having a first end and a second end, said axle rotatably extending through said first lateral side and said second lateral side of said shell, said axle extending through said wheel such that said wheel is rotatably coupled to said axle.

5. The system according to claim 4, further comprising a pair of pedals, each of said pedals being rotatably coupled to said shell wherein each of said pedals is configured to be stood upon thereby facilitating each of said pedals to be pedaled, each of said pedals being coupled to said axle such that said wheel rotates when said pedals are pedaled, said pair of pedals including a first pedal and a second pedal.

6. The system according to claim 5, wherein each of said pedals comprises a first arm having a primary end and a secondary end, said primary end being coupled to said axle having said first arm being oriented perpendicular to said axle.

7. The system according to claim 6, wherein said first arm corresponding to said first pedal is positioned on said first end of said axle, said first arm corresponding to said second pedal being positioned on said second end of said axle, said secondary end orbiting about an axis extending through said first end and said second end of said axle when said pedals are pedaled.

8. The system according to claim 5, further comprising a second arm having a leading end and a following end, said leading end being coupled to said peripheral wall of said shell having said second arm being spaced from said peripheral wall.

9. The system according to claim 8, wherein said second arm corresponding to said first pedal is positioned on said first lateral side of said shell, said second arm corresponding to said second pedal being positioned on said second lateral side of said shell, said following end orbiting around an axis extending through said first lateral side and said second lateral side when said pedals are pedaled.

10. The system according to claim 9, further comprising:
a first arm having a secondary end; and
a panel having a top surface and a peripheral edge, said peripheral edge having a first side, each of said secondary end and said following end being rotatably coupled to said first side having said top surface being horizontally oriented wherein said top surface is configured to be stood upon thereby facilitating said pedals to be pedaled.

11. The system according to claim 1, further comprising a third arm being coupled to said top wall of said shell, said third arm being oriented to extend forwardly from said shell at an upward angle, said third arm having a distal end with respect to said shell and a top side.

12. The system according to claim 11, further comprising a plurality of rings, each of said rings being coupled to said top side of said third arm wherein each of said rings is configured to be gripped.

13. The system according to claim 11, further comprising:
said shopping cart having a rear member; and
a clamp being coupled to said distal end of said arm wherein said clamp is configured to be manipulated said clamp releasably engaging said rear member of said shopping cart such that said pedal unit is removably coupled to said shopping cart.

14. The system according to claim 13, wherein said clamp comprises:
a bottom jaw being coupled to said top side of said third arm, said bottom jaw being concavely arcuate;
a top jaw being hingedly coupled to said bottom jaw, said top jaw being selectively urged into a closed position, said top jaw being concavely arcuate such that said clamp forms a substantially closed loop when said top jaw is in said closed position, each of said top jaw and said bottom jaw engaging said rear member of said shopping cart when said top jaw is in said closed position; and
a lever being coupled to said top jaw wherein said lever is configured to be manipulated, said lever urging said top jaw into said closed position.

15. The system according to claim 2, further comprising a handle being coupled to said shopping cart wherein said handle is configured to be gripped thereby facilitating stability when said pedals are pedaled, said handle having a first end and a second end, said handle being horizontally oriented on said back side of said shopping cart.

16. The system according to claim 15, wherein said handle has a pair of bends thereon, said bends being spaced apart from each other to define a pair of end portions extending away from said back side of said shopping cart.

17. The system according to claim 15, further comprising a pair of grips, each of said grips being coupled to said handle, each of said grips being aligned with an associated one of said first end and said second end of said handle.

18. A pedal driven cart system comprising:
a shopping cart having a basket and a frame, basket having a back side, said frame having a rear member, said rear member being horizontally oriented beneath said back side of said basket; and
a pedal unit being removably coupled to said shopping cart wherein said pedal unit is configured to be pedaled thereby facilitating said shopping cart to be rolled along a support surface, said pedal unit comprising:
a shell having top wall and a peripheral wall extending downwardly therefrom, said peripheral wall having a distal edge with respect to said top wall, said distal edge defining an opening into said shell, said peripheral wall having a first lateral side and a second lateral side, said top wall being concavely arcuate between a front side and a back side of said shell such that said shell has a semi-circular shape,
a wheel being rotatably positioned in said shell, said wheel extending downwardly from said distal edge of said shell wherein said wheel is configured to roll along the support surface,
an axle having a first end and a second end, said axle rotatably extending through said first lateral side and said second lateral side of said shell, said axle extending through said wheel such that said wheel is rotatably coupled to said axle,
a pair of pedals, each of said pedals being rotatably coupled to said shell wherein each of said pedals is configured to be stood upon thereby facilitating each of said pedals to be pedaled, each of said pedals being coupled to said axle such that said wheel rotates when said pedals are pedaled, said pair of pedals including a first pedal and a second pedal, each of said pedals comprising:
a first arm having a primary end and a secondary end, said primary end being coupled to said axle having said first arm being oriented perpendicular to said axle, said first arm corresponding to said first pedal being positioned on said first end of said axle, said first arm corresponding to said second pedal being positioned on said second end of said axle, said secondary end orbiting about an axis extending through said first end and said second end of said axle when said pedals are pedaled,
a second arm having a leading end and a following end, said leading end being coupled to said peripheral wall of said shell having said second arm being spaced from said peripheral wall, said second arm corresponding to said first pedal being positioned on said first lateral side of said shell, said second arm corresponding to said second pedal being positioned on said second lateral side of said shell, said following end orbiting around an axis extending through said first lateral side and said second lateral side when said pedals are pedaled, and a panel having a top surface and a peripheral edge, said peripheral edge having a first side, each of said secondary end and said following end being rotatably coupled to said first side having said top surface being horizontally oriented wherein said top surface is configured to be stood upon thereby facilitating said pedals to be pedaled;

an third arm being coupled to said top wall of said shell, said third arm being oriented to extend forwardly from said shell at an upward angle, said third arm having a distal end with respect to said shell and a top side, a plurality of rings, each of said rings being coupled to said top side of said third arm wherein each of said rings is configured to be gripped, a clamp being coupled to said distal end of said third arm wherein said clamp is configured to be manipulated said clamp releasably engaging said rear member of said shopping cart such that said pedal unit is removably coupled to said shopping cart, said clamp comprising:

a bottom jaw being coupled to said top side of said third arm, said bottom jaw being concavely arcuate, a top jaw being hingedly coupled to said bottom jaw, said top jaw being selectively urged into a closed position, said top jaw being concavely arcuate such that said clamp forms a substantially closed loop when said top jaw is in said closed position, each of said top jaw and said bottom jaw engaging said rear member of said shopping cart when said top jaw is in said closed position, and a lever being coupled to said top jaw wherein said lever is configured to be manipulated, said lever urging said top jaw into said closed position;

a handle being coupled to said shopping cart wherein said handle is configured to be gripped thereby facilitating stability when said pedals are pedaled, said handle having a first end and a second end, said handle being horizontally oriented on said back side of said shopping cart, said handle having a pair of bends thereon, said bends being spaced apart from each other to define a pair of end portions extending away from said back side of said shopping cart, and a pair of grips, each of said grips being coupled to said handle, each of said grips being aligned with an associated one of said first end and said second end of said handle.

* * * * *